United States Patent [19]
Meyer

[11] Patent Number: 6,053,540
[45] Date of Patent: Apr. 25, 2000

[54] FLUID CONDUCTING COUPLING

[76] Inventor: Richard Ernest Meyer, Rte. 1, Box 97A, Loyal, Okla. 73756

[21] Appl. No.: 08/911,306

[22] Filed: Aug. 14, 1997

[51] Int. Cl.[7] .............................. F16L 37/20; F16L 55/00
[52] U.S. Cl. .......................... 288/88; 285/312; 285/320; 285/87
[58] Field of Search ................................. 285/312, 320, 285/81, 87, 88

[56] References Cited

U.S. PATENT DOCUMENTS

| | | |
|---|---|---|
| 2,460,352 | 2/1949 | Jensen . |
| 3,124,374 | 3/1964 | Krapp ........................................ 285/312 |
| 3,439,942 | 4/1969 | Moore et al. ............................ 285/312 |
| 4,222,593 | 9/1980 | Lauffenburger . |
| 4,295,670 | 10/1981 | Goodall et al. . |
| 4,647,075 | 3/1987 | Vargo . |
| 4,802,694 | 2/1989 | Vargo . |
| 5,251,940 | 10/1993 | DeMoss et al. . |
| 5,295,717 | 3/1994 | Chen . |
| 5,338,069 | 8/1994 | McCarthy . |
| 5,435,604 | 7/1995 | Chen . |
| 5,791,694 | 8/1998 | Fahl et al. ................................ 285/312 |
| 5,816,623 | 10/1998 | Chang ...................................... 285/312 |

FOREIGN PATENT DOCUMENTS

| | | | |
|---|---|---|---|
| 512587 | 5/1955 | Canada ................................... | 285/320 |

*Primary Examiner*—Eric K. Nicholson
*Attorney, Agent, or Firm*—Gardere & Wynne, L.L.P.; Lawrence R. Watson

[57] ABSTRACT

Fluid conducting coupling includes a coupler having a first end, a second end for receiving a free end of a connector having a catch disposed on the free end, a flow passageway extending through the first and second ends of the coupler, and a side opening extending transversely through the second end of the coupler. An arm has a first end pivotably connected to the coupler at the opening and a second end extending therefrom. A protuberance is disposed at the first end of the arm for engaging the catch. The arm is pivotable between a coupled position in which the second end of the arm is closer to the coupler and in which the protuberance extends through the side opening in order to engage the catch and obstruct movement of the connector toward and away from the second end of the coupler, and an uncoupled position in which the second end of the arm is further from the coupler and the protuberance does not obstruct movement of the connector. A latch assembly is connected to the arm and pivotable between a latching position and an unlatching position for releasably engaging the exterior of the coupler and thereby releasably latching the arm in the coupled position. The latch assembly is pivotable about a latch axis which is about transverse to the longitudinal axis of the arm.

16 Claims, 5 Drawing Sheets

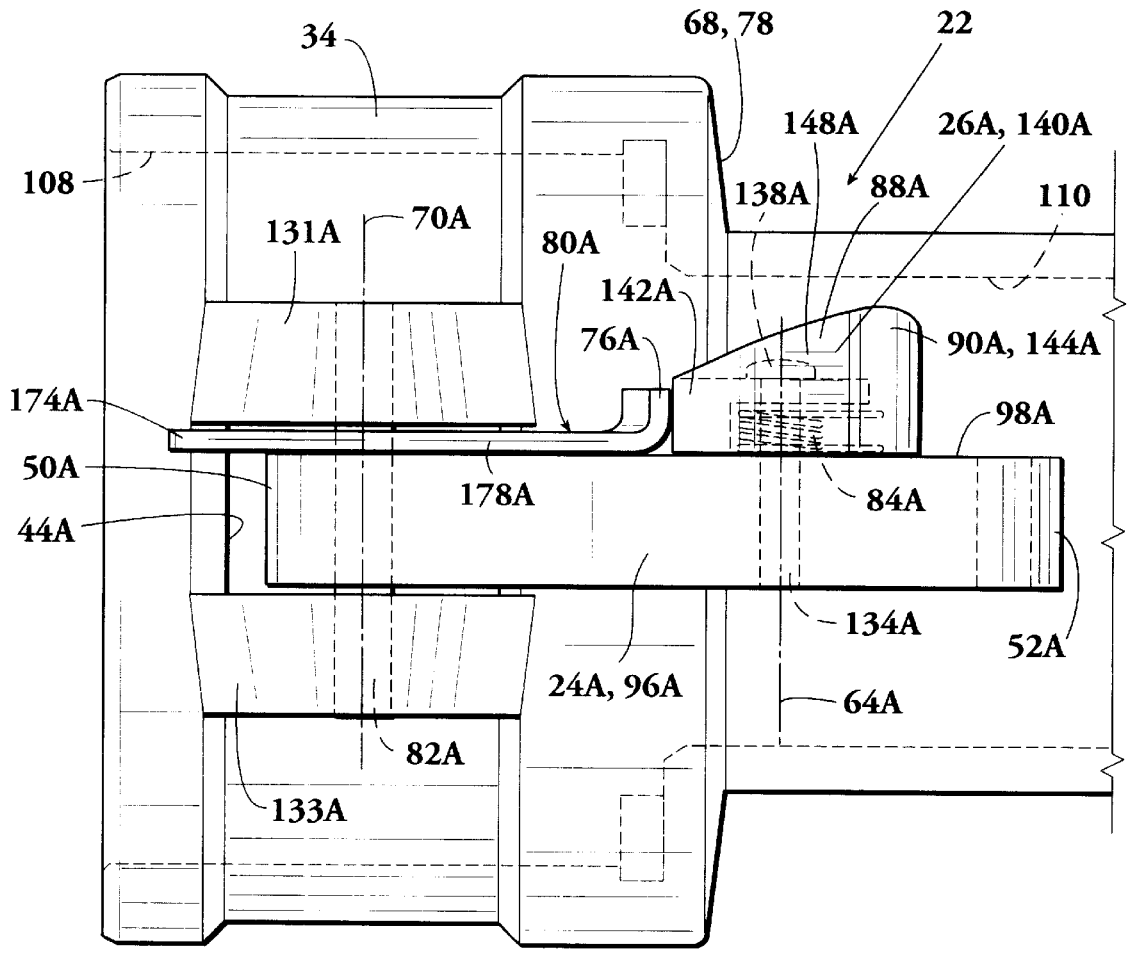
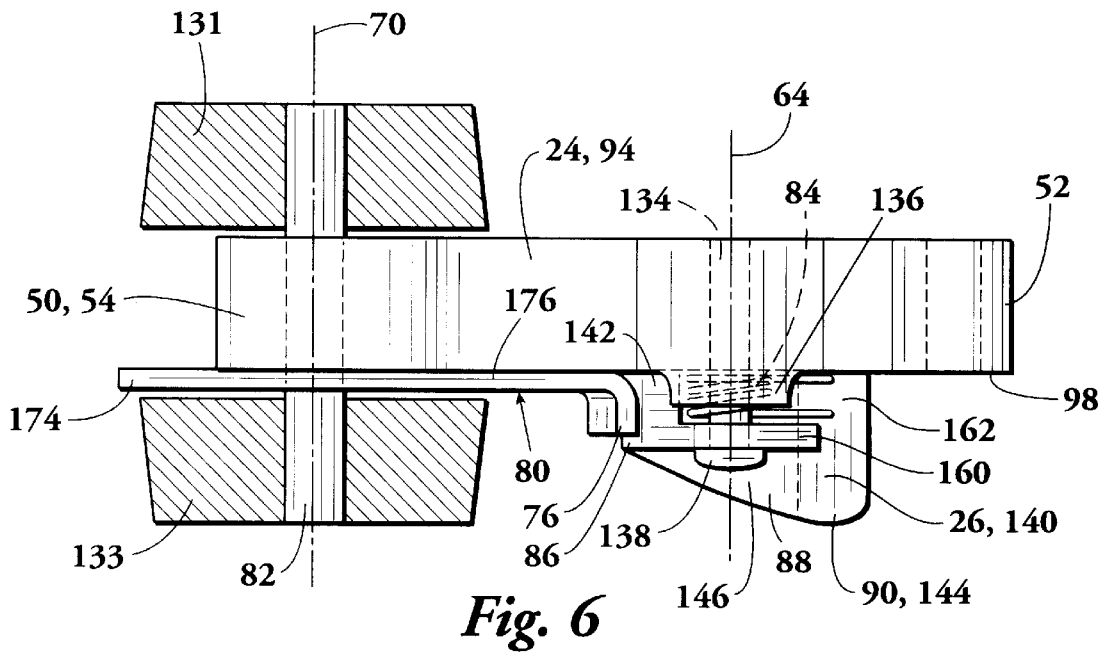

FLUID CONDUCTING COUPLING

BACKGROUND OF THE INVENTION

This invention relates to fluid conducting couplings and more particularly, but not by way of limitation, relates to fluid conducting couplings provided with a safely locking structure to prevent inadvertent, untimely decoupling.

Apparatus and method for coupling conduits, such as piping, tubing, and hosing, are known. For example, U.S. Pat. No. 4,222,593 (Lauffenburger) discloses a fluid conveying coupling having male and female coupling members, at least one (1) coupling lever pivotably mounted on the female coupling member and having a cam portion engageable in a groove in the male coupling member for releasably coupling the male and female coupling members together, and at least one (1) safety locking device for locking the coupling lever against accidental displacement from its coupling position. The coupling lever or arm 16, 18 is releasably locked in its latching position by locking pin 56 which is mounted for rectilinear movement along a path extending transversely to and overlying the coupling lever's longitudinal axis. A thumb lever 58 is pivotably mounted on the coupling body 14 to provide for pivotal displacement of thumb lever 58 about an axis extending parallel to the coupling's longitudinal axis. The longitudinal axis of lock pin 56 and the straight line path of movement of lock pin 56 lie in a plane normally intersecting the pivot axis of thumb lever 58 and the longitudinal coupling axis. Shortcomings of the Lauffenburger device include the mounting of the thumb lever and lock pin support structure on the body of the coupling member 14; and the perpendicular orientation of the thumb lever 56 to the coupling lever 16, 18, which requires the thumb lever 56 to extend around the body 14 creating the need for guard protectors 62, 63, and which apparently positions the thumb lever 58 such that two (2) human hands are required to operate the thumb lever while decoupling the coupling. Another shortcoming of Lauffenburger is the need for base 50 which seats against a surface of the female coupling member 14 and which must be fixed to the female coupling member 14 by welding or by screws, as illustrated in FIGS. 4 and 5 of Lauffenburger.

U.S. Pat. No. 4,295,670 (Goodall) discloses a quick disconnect cam locking safety coupling which uses locking levers 34 having openings 35 which receive a lug 36. The lug 36 is an integral part of socket 12, and therefore must be formed with the sock 12 or welded, screwed, or otherwise fastened thereto. Lug 36 has an opening 38 which receives a straight portion 42 of a wire locking pin 40 in order to hold the lever 34 in the coupled or locked position. Shortcomings of Goodall include the necessity of forming or mounting the lug 36 on socket 12, the use of a separate locking pin 78 (i.e. the latching device is not self-contained), and the need for two (2) human hands to lock and unlock the lever 34.

U.S. Pat. No. 4,647,075 (Vargo) discloses a quick disconnect coupling having a spring safety interlock. A wire safety spring element 46, 48 has a blocking loop 52 carried at the free upper end thereof and which lies across or projects into the path of latching handle 38, 40 in order to arrest unintentional decoupling of the latching handles 38, 40. The resilient nature of the wire safety spring 46, 48 creates a shortcoming in that it inherently weakens the blocking force of the spring safety interlock and renders it somewhat unpredictable.

There is a need for a fluid conducting coupling having a latching mechanism which is retrofittable to a standard cam and groove coupling or the like; which is wholly located on the coupling arm and not on the body of the coupling; which is self-contained and does not require separate pins, rings, or the like; which is retrofittable,e on materials other than aluminum and stainless steel; which does not have parts which protrude out of the coupling and may cause damage to the coupling and/or accidental decoupling; and which is operable with one (1) human hand.

SUMMARY OF THE INVENTION

The present invention is contemplated to overcome the foregoing deficiencies and meet the above described needs. In accomplishing this, the present invention provides a novel and improved conduit coupling.

Accordingly, the fluid conducting coupling includes a coupler, an arm, and latch means. The coupler has a first end, a second end for receiving a free end of a connector having a catch disposed on the free end, a flow passageway extending through the first and second ends of the coupler, and a side opening extending transversely through the second end of the coupler. The arm has a first end pivotably connected to the coupler at the opening and a second end extending therefrom. A protuberance is provided at the first end of the arm for engaging the catch. The arm is pivotable between a coupled position in which the second arm is closer to the coupler and in which the protuberance extends through the side opening in order to engage the catch and obstruct movement of the connector toward and away from the second end of the coupler, and an uncoupled position in which the second end of the arm is further from the coupler and the protuberance does not obstruct movement of the connector.

The latch means is connected to the arm and is pivotable between a latching position and an unlatching position for releasably engaging the exterior of the coupler and thereby releasably latching the arm in a coupled position. The latch means is pivotable about a latch axis which is about transverse to the longitudinal axis of the arm and the longitudinal axis of the coupler.

It is an advantage of the present invention to provide a fluid conducting coupling having a latch mechanism which is retrofittable to a standard cam and groove coupling.

It is an advantage of the present invention to provide a fluid conducting coupling having a latch mechanism which is wholly located on the arm used to couple and uncouple the coupling, and which is not located or mounted on the stationary body of the coupling.

It is an advantage of the present invention to provide a fluid conducting coupling which is self-contained and does not require discrete and several pins, rings, or the like.

It is an advantage of the present invention to provide a fluid conducting coupling having a latch mechanism which is retrofittable not only on aluminum and stainless steel, but on other materials as well.

It is an advantage of the present invention to provide a fluid conducting coupling having a latch mechanism which does not have parts or components which protrude out of the general profile of the coupling and which may cause damage to the coupling and/or accidental decoupling.

It is an advantage of the present invention to provide a fluid conducting coupling having a latch mechanism which is operable with one human hand.

BRIEF DESCRIPTION OF THE DRAWINGS

The present invention will be better understood by reference to the examples of the following drawings:

FIG. 5 is a view along line 5—5 of FIG. 1.

FIG. 6 is a view along line 6—6 of FIG. 1.

DETAILED DESCRIPTION OF THE PREFERRED EMBODIMENTS

Figure 1:
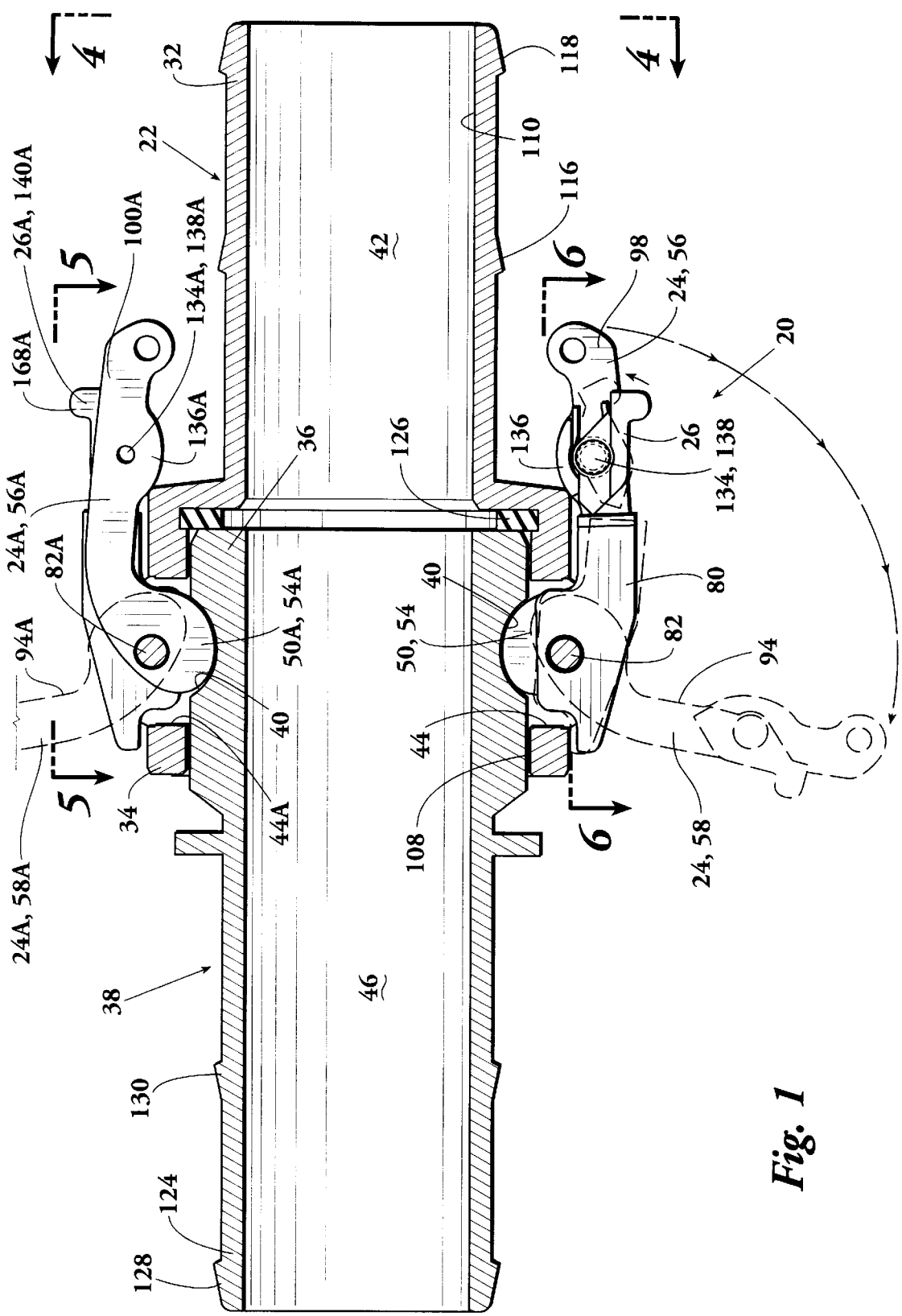
FIG. 1 is a sectional view of an embodiment of the fluid conducting coupling of the present invention showing the arms in the coupled position in solid lines and in the uncoupled position in broken lines.

Preferred embodiments of the invention will now be described with reference to the drawings. Like reference numerals or characters refer to like or corresponding parts throughout the drawings and description.

FIGS. 1–6 present embodiments of the fluid conducting coupling 20 of the present invention. Although the invention is referred to herein as a cam and groove coupling used with piping, tubing, and hosing which is normally round, it is intended to be understood that the invention may be used with virtually any shape of conduit and/or conduit connectors and may be used with liquid and gaseous fluids as well as dry bulk fluids, such as resins, flour, sugar, powders, and the like. The coupling 20 may be an integral portion of a fluid containment structure, piping, hosing, or the like. In the preferred embodiment, the coupling 20 is a separable fitting which may be fastened to a fluid containment structure, piping, hosing, or the like. It is; contemplated that the most typical use of the coupling 20 will be for connecting flexible piping, hoses, or other tubular conduit to a fluid containment structure such as a tank or tanker. If the fluid conducting coupling 20 is to be used with a fixed or stationary fluid containment structure, preferably the coupler 22 is mounted on the fluid containment structure and the connector 38 is attached to the flexible hose or conduit so that the arms 24 and latch means 26 are in a safer, more secure and protected environment, i.e., the flexible hose is more likely to be dropped and thrown around, posing a greater likelihood of damage to the arms 24 and latch means 26 of the coupler 22.

Referring to the example of FIG. 1, the conduit coupling 20 may be generally described as including a coupler 22, an arm 24, and latch means 26. The coupler 22 provides a structure to which the arm 24 may be connected and disposed for fastening the coupler 22 to connector 38. Multiple arms 24 and latch means 26 may be used.

In the prototype embodiment, the coupler 22 has a first end 32, a second end 34 for receiving a free end 36 of a connector 38 having a catch 40 on the free end 36. A flow passageway 42 extends through the first and second ends 32, 34 of the coupler 22. A side opening 44 extends transversely through the second end 34 of the coupler 22. A flow passageway 46 extends through the connector 38.

Figure 2:
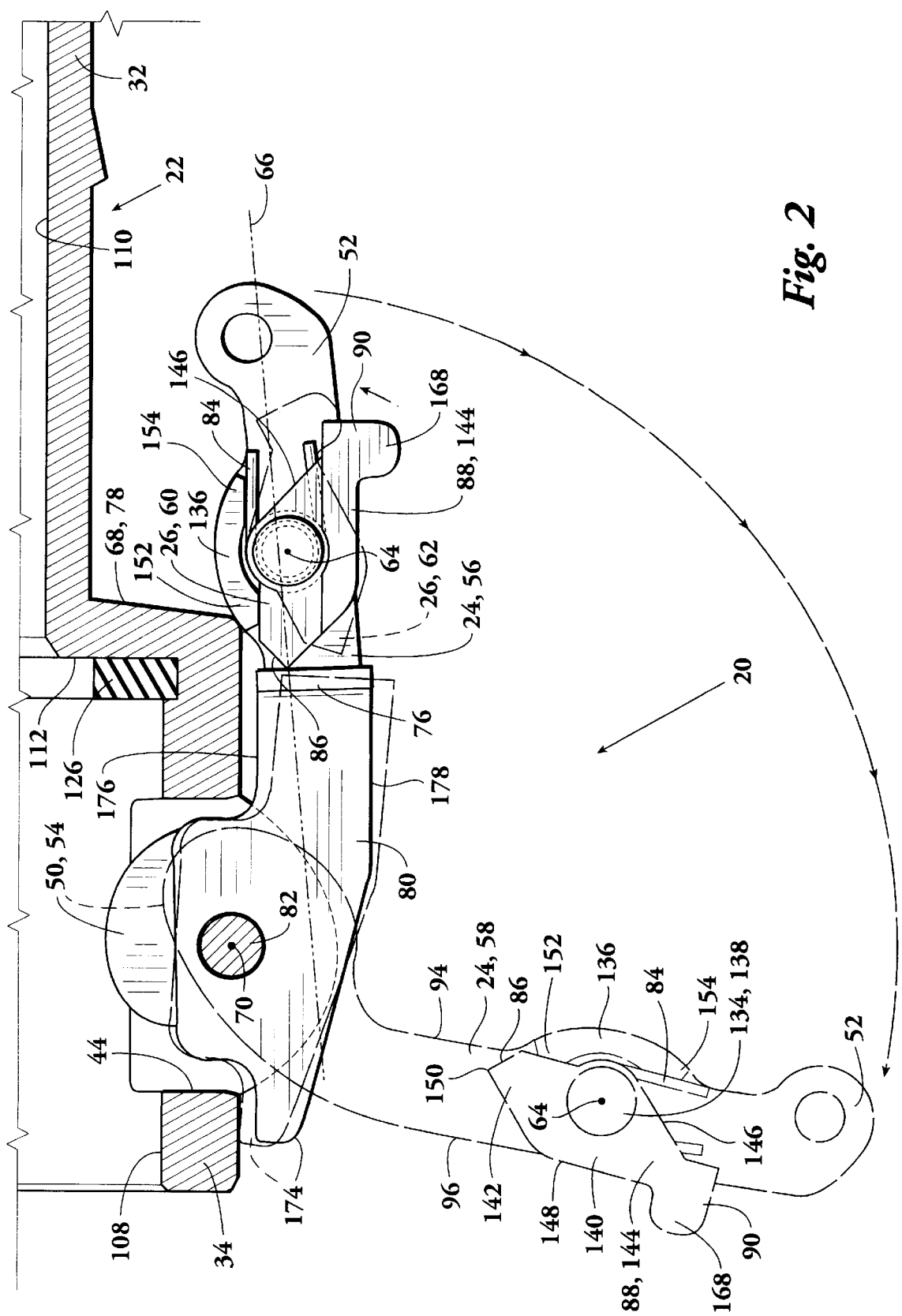
FIG. 2 is an enlarged view of the lower arm of FIG. 1.

Referring to the example of FIGS. 1 and 2, the preferred arm 24 has a first end 50 pivotably connected to the coupler 22 at the opening 44 and a second end 52 extending therefrom. The preferred arm 24 has a protuberance 54 at the first end 50 of the arm 24 disposed for engaging the catch 40. The arm 24 is pivotable between a coupled position 56 in which the second end 52 of the arm 24 is closer to the coupler 22 and in which the protuberance 54 extends through the side opening 44 in order to engage the catch 40 and obstruct movement of the connector 38 toward and away from the second end 34 of the coupler 22; and an uncoupled position 58 in which the second end 52 of the arm 24 is further from the coupler 22 and the protuberance 54 does not obstruct movement of the connector 38.

Referring to the example of FIG. 2, the preferred latch means 26 is connected to the arm 24 and is pivotable between a latching position 60 and an unlatching position 62, the latch means 26 being pivotable about a latch axis 64 which is about transverse to the longitudinal axis 66 of the arm 24. The latch means 26 is used for releasably engaging the exterior 68 of the coupler 22 and thereby releasably latching the arm 24 in the coupled position 56 when the arm 24 is moved into the coupled position 56. In the preferred coupling 20, the latch axis 64 is about parallel to and spaced away from the pivotal axis 70 of the arm 24.

Referring to the example of FIG. 2, the preferred coupling 20 includes a guide surface 76 located on the exterior 68 of the coupler 22, for engaging the latch means 26. The guide surface 76 may be an integral portion of the coupler 22, for example, the guide surface 76 may be formed or cast as an integral part of the coupler 22. As another example, the shoulder 78 formed at the transition between the first and second ends 32, 34 of the coupler 22 may be used as the guide surface by appropriately positioning the latch means 26 on the arm 24, as would be known to one skilled in the art in view of the disclosure contained herein. The guide surface 76 should be sufficiently spaced away from the pivotal axis 70 of the arm 24 that the latch means 26 will have adequate mechanical advantage to securely hold the arm 24 in the coupled position 56.

Figure 3:
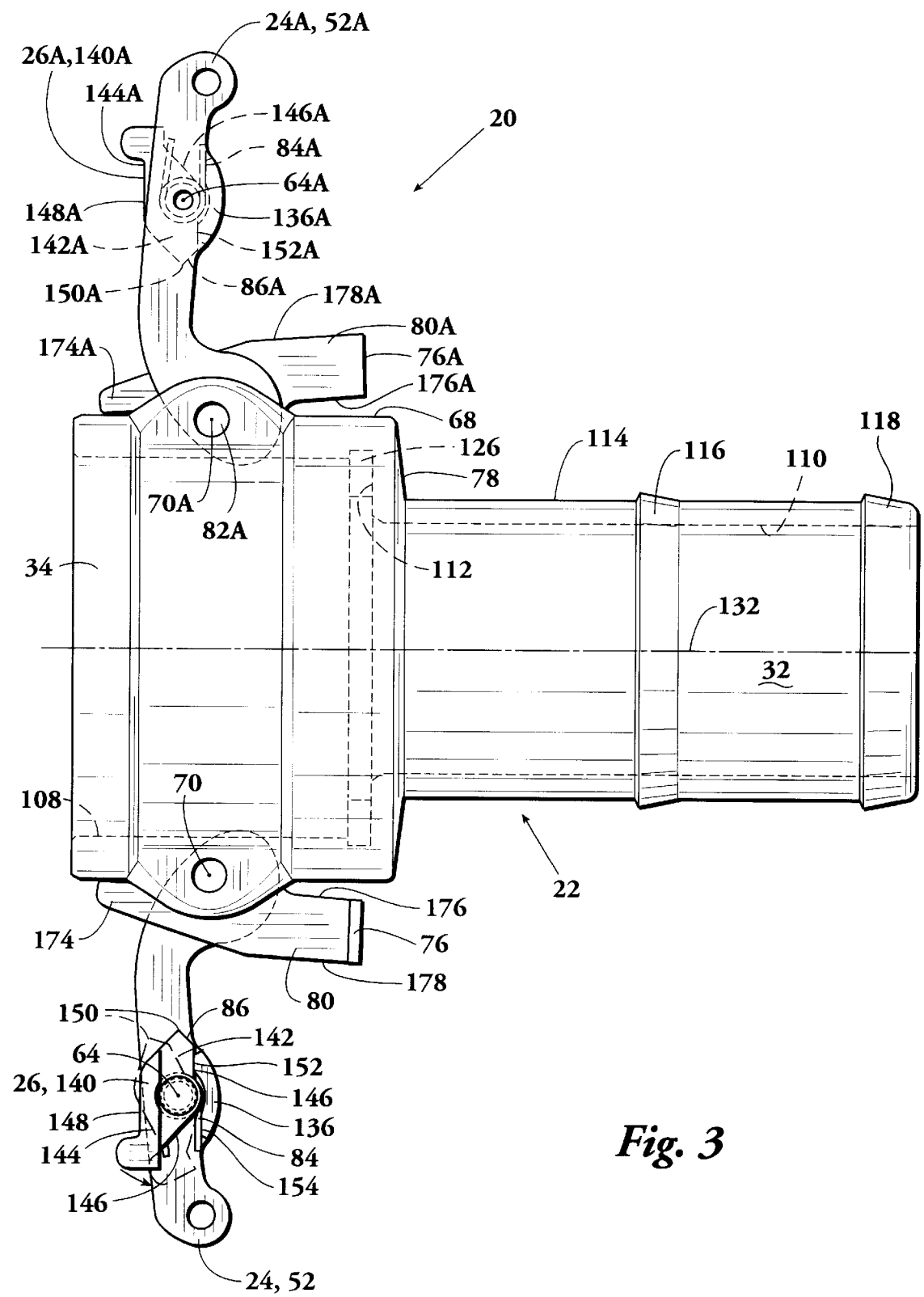
FIG. 3 is a front elevational view of an embodiment of the coupler of the present invention showing the arms in the uncoupled position.

In the preferred embodiment, referring to the example of FIGS. 2 and 3, the guide surface 76 is a guide plate 80 connected to the exterior 68 of the coupler 22. The preferred arm 24 is pivotable about a pin 82 and the guide plate 80 is connected to the pin 82 adjacent to the arm 24. As will be further discussed below, the guide plate 80 may be added to the pin 82 of an existing cam and groove coupling or the like in order to retrofit the latch means 26 and guide plate 80 to a coupling.

Figure 4:
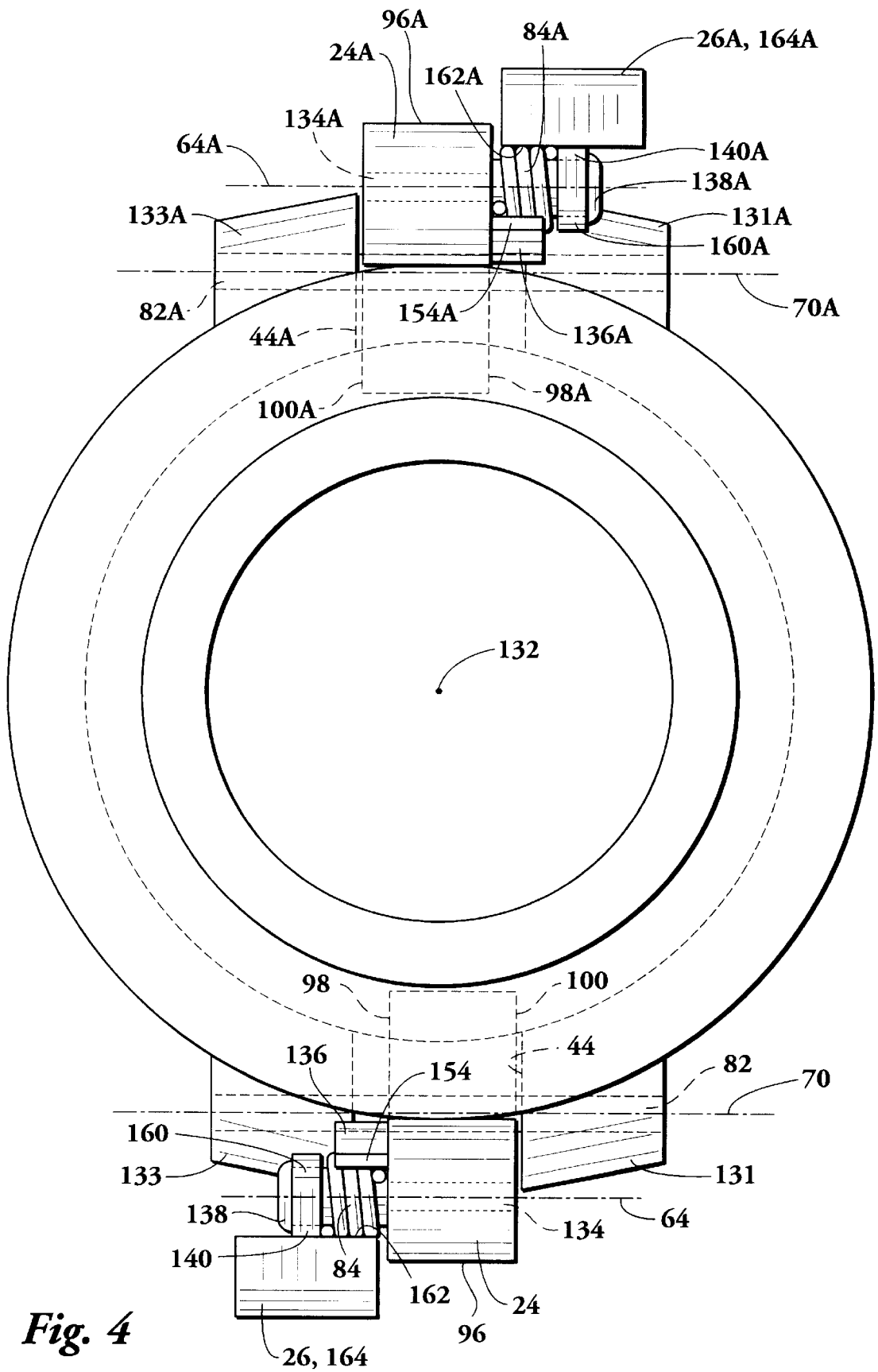
FIG. 4 is a view along line 4—4 of FIG. 1.

Referring to the example of FIGS. 2 and 4, the latch means 26 includes bias means 84 for biasing the latch means 26 into the latching position 60. The preferred bias means 84 is a spring. The bias means 84 may be any form of spring or resiliently biasing mechanism which will bias the latching means into the latching position, e.g., a tension spring, a compression spring, coil spring, spring rod, etc., all of which would be known to one skilled in the art in view of the disclosure contained herein.

The preferred latch means 26 includes a camming surface 86 for contacting the guide surface 76 and moving the latch means 26 towards the unlatching position 62 when the arm 24 is moved from the uncoupled position 58 towards the coupled position 56, thereby allowing the arm 24 to move into the coupled position 56. Preferably, the camming surface 86 extends towards the pivotal axis 70 of the arm 24 from the latch axis 64 and terminates between the latch axis 64 and the pivotal axis 70 at a point spaced away from the pivotal axis 70 of the arm 24. The guide surface 76 is spaced away from the pivotal axis 70 towards the camming surface 86 in the coupled position 56 of the arm 24 such that the guide surface 76 and camming surface 86 function as previously described.

Referring to the example of FIG. 2, the preferred latch means 26 further includes a lever 88 connected to the camming surface 86 and having a free end 90 extending towards the second end 52 of the arm 24 from the camming surface 86, and latch axis 64. The lever 88 provides for leveragingly moving the latch means 26 from the latching position 60 to the unlatching position 62, as further discussed below. Preferably the arm 24 has an inside surface 94 facing the coupler 22 (in the coupled position 56), an outside surface 96 facing away from the coupler 22, and two (2) lateral sides 98, 100 (FIG. 4), all extending between the first and second ends 50, 52 of the arm 24; and the latch means 26 is disposed on one (1) of the lateral sides 98, 100 of the arm 24. The free end 90 of the preferred lever 88 terminates between the latch axis 64 and the second end 52 of the arm 24 so that a human user may, with one (1) hand, unassisted by the other hand, move the lever 88 and latch means 26 from the latching position 60 to the unlatching position 62 while moving the arm from the coupled position 56 to the uncoupled position 58.

Referring to the example of FIG. 1, the preferred coupling 20 includes a second side opening 44A, second arm 24A, and second latch means 26A. Preferably, the second side opening 44A is diametrically opposite the first side opening 44 on the coupler 22. Preferably, the second arm 24A and second latch means 26A are identical to the first arm 24 and first latch means 26. In the prototype coupling 20, the arms 24, 24A and guide plates 80, 80A may be interchanged. The catch 40 circumscribes the free end 36 of the connector 38, and, in the prototype coupling 20, the catch 40 is a groove formed in the free end 36 of the connector 38.

The coupler 22 may be a male-type fitting (not illustrated) and the connector 38 a female-type fitting or socket, in which case the protuberance 54 would be on the outside surface 96 of the arm 24 and would extend through the side opening 44 to the exterior of the coupler 22 in the coupled position, with the catch being on the inside surface of the connector 38, as would be known to one skilled in the art in view of the disclosure contained herein. In the more preferred embodiment and prototype coupling 20, referring to the example of FIG. 1, the second end 34 of the coupler 22 comprises a socket, the catch 40 is on the outside surface of the free end 36 of the connector 38 and the protuberance 54 extends from the first end of the arm 24 towards the coupler 22 in the coupled position 56. In the coupled position 56, the protuberance 54 extends through the side opening 44 into the interior of the coupler 22 in order to engage the catch 40. As previously mentioned, the preferred catch 40 circumscribes the outside surface of the free end 36 of the connector 38; and, in the prototype coupling 20, the catch comprises a groove formed in the free end 36 of the connector 38.

Referring to the example of FIGS. 2 and 4, the structure of the preferred embodiment and prototype coupling 20 will now be described in more detail In the prototype coupler 22 the second end 34 forms a socket with the first end 32 extending therefrom. The second end/socket 34 has an enlarged flow passageway 108 with respect to the first end 32 which has a flow passageway 110 of smaller, constant diameter. The outside diameter of the exterior 68 of the second end/socket 34 is larger than the outside diameter of the first end 32. The transition from the first end 32 to the second end 34 forms shoulder 78 on the outside of the coupler 22 and an inside shoulder 112 on the inside of the coupler 22. In the prototype coupler 22, the exterior 114 of the first end 32 of the coupler 22 is generally cylindrical in shape and has hose barbs 116, 118 which will frictionally retain the end of a flexible hose or tubing which is press-fitted thereover. The first end 32 of the coupler 22 may take any shape desired for connecting the coupler 22 to a fluid containment structure. For example, the first end 32 may be threaded (externally or internally), may be shaped for welding or chemically bonding the coupler 22 to a fluid containment structure, or the first end 32 may be an integral part of a fluid containment structure, all of which would be known to one skilled in the art in view of the disclosure contained herein. Referring to example FIG. 1, the prototype connector 38 has first free end 36 and a second end 124. The free end 36 is shaped and sized to fit inside the socket formed by the second end 34 of coupler 22 and sealingly engage gasket ring 126. The preferred gasket ring 126 is an annual, elastomeric ring which fits against shoulder 112 and may be friction fit and/or bonded against shoulder 112. The free end 36 includes catch 40, which in the prototype is a groove circumscribing the exterior surface of the free end.

In the prototype coupling, the flow passageway 46 is of constant diameter throughout the length of the connector 38. The second end 124 of the connector 38 is generally cylindrical in shape and includes hose barbs 128, 130 for frictionally retaining the end of a flexible hose or tubing which is press-fitted thereover. The second end 124 of the connector 38 may be made of any shape or size desired to connect or fasten the connector to hosing, piping, or a fluid containment structure. For example, the second end 124 may have external threads, or internal threads, may be shaped for welding or chemically bonding to a fluid containment structure or piping, or may be an integral part of a fluid containment structure or piping, as would be known to one skilled in the art in view of the disclosure contained herein.

The coupler 22 and connector 38 may be cast or otherwise fabricated from suitable material. In the prototype coupling 20, referring to the example of FIGS. 1 and 4, arms 24, 24A are disposed on diametrically opposed sides of the second end 34 of the coupler 22 by means by pivot pins 82, 82A. The pivotably connected first ends 50, 50A of arms 24, 24A are received in side openings 44, 44A. Preferably, the protuberances 54, 54A are integrally formed on the inside surface 94, 94A of the first end 50, 50A. The pivotal axes 70, 70A of the arms 24, 24A are parallel and lie in a common plane normally intersecting the longitudinal axis 132 of the coupler 22. Preferably, the coupler 22 includes lugs 131, 133, 131A, 133A extending from opposite, transverse (with respect to the longitudinal axis 132 of the coupler 22) sides of the side openings 44, 44A for mounting the pivot pins 82, 82A and receiving the first ends 50, 50A of arms 24, 24A.

As previously discussed, and exemplified in FIG. 1, the free end 36 of connector 38 is adapted to be slidably and coaxially received in the enlarged flow passageway 108 of the socket/second end 34 of the coupler 22 and to seat against and seal with the gasket ring 126. The peripheral groove of catch 40 registers with the side openings 44, 44A when the free end 36 is fully inserted into the socket of second end 34 in such a position that the end face of the free end 36 seats against gasket ring 126.

Referring to the example of FIGS. 1 and 2, arms 24, 24A may be manually moved or pivoted between the uncoupled position 58 and the coupled position 56 of the arms 24, 24A. When arms 24, 24A are moved to the extreme uncoupled positions 58, 58A, their protuberances (which are preferably eccentric cams) 54, 54A do not project into flow passageway 108 and thereby allow for the insertion and removal of the connector 38. When the free end 36 of the connector 38 is received in the flow passageway 108, rotation of the arms 24, 24A to their coupled positions 56, 56A causes protuberances 54, 54A to move into flow passageway 108 and to ride into the groove of catch 40. The camming action of the protuberances 54, 54A, in the groove-shaped catch 40 draws the free end 36 of connector 38 tightly against gasket ring 126 and establishes a fluid tight seal between coupler 22 and connector 38.

Referring to the example of FIGS. 1 and 2, latch means 26, 26A are pivotably mounted on arms 24, 24A, respectively, with latch pins 134, 134A. Latch pins 134, 134A are seated in embossments 136, 136A. The embossments 136, 136A may be discrete and several components which are added to the arms 24, 24A and secured thereto with screws, bolts, welding, bonding, or the like. In the prototype coupling 20, the embossments 136, 136A are integrally formed on the arms 24, 24A.

The latch pins 134, 134A have a free end 138, 138A which extends out of the embossment on a lateral side 98, 98A of the arm 24, 24A. In the prototype coupling 20, the free end 138, 138A extends from the right side 98, 98A of the arms 24, 24A when viewed from the outside surface 96, 96A of the arm 24, 24A with the first end 34 of the coupler 22 at the top; although the free end 138, 138A may extend out the left lateral side 100, 100A, as would be known to one skilled in the art in view of the disclosure contained herein. Latch body 140, 140A is pivotably mounted on the free end 138, 138A of the latch pin 134, 134A. The latch body 140, 140A, latch pin 134, 134A, and other structure may be disposed to connect the latch body 140, 140A on either lateral side of the arm 24, 24A. It is contemplated to be advantageous to manufacture all arms 24, 24A with the latch body 140, 140A on the same side of the arm so that the arms will be interchangeable.

Referring to FIGS. 2 and 3, the latch body 140, 140A includes a latching end 142, 142A extending towards the first end 50, 50A of arm 24, 24A; a lever end 144, 144A extending toward the second end 52, 52A of the arm 24, 24A; and inner surface 146, 146A facing the coupler 22 in the coupled position; and an outer surface 148, 148A facing away from the coupler 22 in the coupled position 56, 56A. The inner surface 146, 146A at the latching end 142, 142A is beveled or angled from the inner surface 146, 146A towards the latching end 142, 142A and outer surface 143, 148A in order to create the camming surface 86, 86A. The degree or angle of the camming surface 86, 86A is sufficient that the camming surface directly contacts the guide surface 76, 76A when the arm is moved from the uncoupled position 58 toward the coupled position 56, 56A and the camming surface 86, 86A pivots the latch body 140, 140A against the bias of the spring 84, 84A until the apex 150, 150A of the latching end 142, 142A clears the guide surface 76, 76A and allows the arm 24, 24A to move into the coupled position 56, 56A. The angle of the camming surface 86, 86A should also be sufficient to clear the guide surface 76, 76A when the latch body 140, 140A is in the unlatching position 62, 62A, best exemplified in FIG. 2, so that the arm 24, 24A may be moved to the uncoupled position 58, 58A.

The outer surface 148, 148A of the latch body 140, 140A at the latching end 142, 142A is beveled or angled towards the apex 150, 150A sufficiently that the outer surface 148, 148A does not contact the guide surface 76, 76A after the apex 150, 150A clears the guide surface 76, 76A and moves into the coupled position; and also when the latch body 140, 140A is moved towards or is in the unlatching position 62, 62A, such as is necessary when moving the arm 24, 24A from the coupled position 56, 56A to the uncoupled position 58, 58A.

Referring to the example of FIG. 2, the prototype latch means 26, 26A includes a latch stop 152, 152A and lever stop 154, 154A extending from the arm 24, 24A or embossment 136, 136A. The latch stop 152, 152A contacts the inner surface 146, 146A of the latching end 142, 142A in order to limit pivotal travel of the latch body 140, 140A towards the latching position 60, 60A and holds the latch body 140, 140A in the latching position 60, 60A against the bias of bias means or spring 84. The lever stop 154, 154A contacts the inner surface 146, 146A of the lever end 144, 144A (through the end of the spring 84, 84A in the prototype coupling 20) and limits pivotal travel of the latch body 140, 140A towards the unlatching position 62, 62A. In the prototype coupling 20, the embossment 136, 136A projects from the arm 24, 24A below the inner surface 146, 146A of the latch body 140, 140A to form the latch stop 152, 152A and lever stop 154, 154A.

Referring to the example of FIG. 4, the prototype latch body 140, 140A is generally T-shaped in vertical cross-section at the lever end 144, 144. The latch pin 134, 134A passes through the vertical leg 160, 160A of the T-shape. The prototype bias means 84 is a coil spring, also designated 84, which is mounted around the latch pin 134, 134A between the vertical leg 160, 160A of the T and the arm 24, 24A. The spring 84, 84A is compressed between the lever stop 154, 154A and the underside 162, 162A of the horizontal top member 164, 164A of the T-shaped latch body 140, 140A and thereby biases the latch body 140, 140A into the latching position 60, 60A against the latch stop 152, 152A. In the prototype coupling 20, the latch stop 152, 152A and lever stop 154, 154A are on opposite ends of an arcuate projection of the embossment 136, 136A from the arm 24, 24A. The portion of the embossment 136, 136A between the latch stop 152, 152A and lever stop 154, 154A provides a guard to protect the spring 84, 84A.

The T-shaped latch body 140, 140A also provides a recess on the side of the vertical leg 160, 160A below the top member 164, 164A and facing away from the arm 24, 24A, which houses and protects the outer extremity of the free end 138, 138A of the latch pin 134, 134A. The T-shaped cross-section of the latch body 140, 140A, extends from the lever end 144, 144A sufficiently beyond the latch pin 134, 134A to accommodate the spring 84, 84A. The latching end 142, 142A of the latch body 140, 140A is substantially solid material in vertical cross-section in order to strengthen the latching end 142, 142A, as best seen in FIGS. 5 and 6.

Referring to the example of FIGS. 2 and 3, in the prototype coupling 20, the inner surface 146, 146A at the lever end 144, 144A of the latch body 140, 140A is beveled or angled towards the lever end 144, 144A and towards outer surface 148, 148A. The magnitude or angle of the bevel is sized, in conjunction with the location of the lever stop 154, 154A and camming surface 86, 86A so that the apex 150, 150A and camming surface 86, 86A are completely disengaged from the guide surface 76, 76A and will allow the arm 24, 24A to move to the uncoupled position 58, 58A when the latch body is in the unlatching position 62, 62A (and the beveled inner surface 146, 146A of the lever end 144, 144A is in contact with the lever stop 154, 154A). The outer surface 148, 148A at the lever end 144, 144A is shaped to minimize the profile of the latch means 26, 26A and to thereby reduce the likelihood of accidental uncoupling of the arm 24, 24A. The lever end 144, 144A should extend sufficiently from the latch axis 64, 64A toward the arm second end 52, 52A that the latch body 140, 140A can be moved to the unlatching position 62, 62A with one hand. Preferably, referring to FIGS. 5 and 6, the outer surface 148, 148A of the lever end 144, 144A is wider at its extremity than at the latch axis 64 in order to facilitate operation with one hand and to better protect the spring 84, 84A and latch pin 134, 134A. As best exemplified in FIG. 2, an upstanding lobe 168, 168A may be provided on the outer surface 148, 148A at the extremity of the lever end 144, 144A to ease operation with one hand. The size and shape of the lobe 168, 168A, as well as the remainder of the latch body 140, 140A and latch means 26, 26A should be shaped and sized to minimize the chance of accidental decoupling of the arm 24, 24A.

Referring to the example of FIGS. 2 and 3 the guide plate 80, 80A is pivotably positioned on shaft 82, 82A on the same lateral side of the arm 24, 24A as the latch body 140, 140A. The inner end of the guide plate 80, 80A forms guide surface 76, 76A. The outer end 174, 174A extends on the opposite side of the shaft 82, 82A from the guide surface 76, 76A and serves as a stop for limiting pivotal motion of the guide plate 80, 80A about shaft 82, 82A. The guide plate 80, 80A has a bottom surface 176, 176A which is adjacent the coupler 22, 22A and extends between the guide surface 76, 76A and outer end 174, 174A. The bottom surface 176, 176A at each end of the guide plate contacts the coupler 22 and limits rotational motion of the guide plate 80, 80A about shaft 82, 82A in the two directions the guide plate 80, 80A is free to rotate. The guide plate 80, 80A also has a top edge or surface 178, 178A which faces away from the coupler 22. As best exemplified in FIG. 5, when viewed from the top surface 178, 178A the preferred guide plate 80, 80A is generally L-shaped. The bottom of the L-shape forms the guide surface 76, 76A which contacts the latch body 140, 140A and enhances the durability of the guide plate 80, 80A. As best exemplified in FIGS. 2 and 3, in the prototype latch means 26, 26A the top surface 178, 178A of the guide plate 80, 80A is beveled towards the outer end 174, 174A to minimize the profile and extension of the guide plate 80, 80A above the overall configuration of the latch means 26, 26A and thereby reduce the likelihood of wear and tear and damage to the latch means.

While presently preferred embodiments of the invention have been described herein for the purpose of disclosure, numerous changes in the construction and arrangement of parts and/or the performance of steps will suggest themselves to those skilled in the art in view of the disclosure contained herein, which changes are encompassed within the spirit of this invention as defined by the following claims.

What is claimed is:

1. Fluid conducting coupling, comprising:

a coupler having a first end, a second end for receiving a free end of a connector having a catch disposed on the free end, a flow passageway extending through the first and second ends of the coupler, and a side opening extending transversely through the second end of the coupler;

an arm having a first end pivotably connected to the coupler at the opening and a second end extending therefrom, the arm having a protuberance disposed for engaging the catch at the first end of the arm, the arm being pivotable between a coupled position in which the second end of the arm is closer to the coupler and in which the protuberance extends through the side opening in order to engage the catch and obstruct movement of the connector toward and away from the second end of the coupler, and an uncoupled position in which the second end of the arm is further from the coupler and the protuberance does not obstruct movement of the connector; and latch means, connected to the arm and pivotable between a latching position and an unlatching position about a single latch axis, for releasably engaging the exterior of the coupler and thereby releasably latching the arm in the coupled position, the latch axis being about transverse to the longitudinal axis of the arm, the latch means pivoting in the opposite direction of the arm as the arm is moved from the coupled position in order to release the arm from the coupled position, the latch means comprising:

a latch body have a latching end extending toward the first end of the arm and a lever end extending toward the second end of the arm, the latching end terminating in an apex extending toward the first end of the arm which releasably engages the exterior of the coupler in the coupled position of the arm, the engagement of the apex with the exterior of the coupler holding the arm in the coupled position.

2. Coupling of claim 1:

wherein the latch axis is about parallel to and spaced away from the pivotal axis of the arm.

3. Coupling of claim 1, comprising:

a guide surface, located on the exterior of the coupler, for engaging the latch means.

4. Coupling of claim 3:

wherein the guide surface is an integral portion of the coupler.

5. Coupling of claim 3 in which the guide surface comprises:

a guide plate connected to the exterior of the coupler.

6. Coupling of claim 3 in which the arm is pivotable about a shaft and the guide surface comprises:

a guide plate connected to the shaft adjacent to the arm.

7. Coupling of claim 3 in which the latch means comprises:

bias means for biasing the latch means into the latching position.

8. Coupling of claim 7 in which the bias means comprises:

a spring.

9. Coupling of claim 7 in which the latch means comprises:

a camming surface for contacting the guide surface and moving the latch means towards the unlatching position when the arm is moved from the coupled position, thereby allowing the arm to move into the coupled position.

10. Coupling of claim 9 wherein the camming surface extends towards the pivotal axis of the arm from the latch axis, the latch means further comprising:

a lever, connected to the camming surface and having a free end extending towards the second end of the arm from the camming surface and latch axis, for leveragingly moving the latch means from the latching position to the unlatching position.

11. Coupling of claim 10:

wherein the arm has an inside surface facing the coupler in the coupled position, an outside surface facing away from the coupler in the coupled position, and two lateral sides, all extending between the first and second ends of the arm; and the latch means is disposed on one of the lateral sides of the arm.

12. Coupling of claim 11:

wherein the free end of the lever terminates between the latch axis and the second end of the arm so that a human user may, with one hand, move the lever and latch means from the latching position to the unlatching position while moving the arm from the coupled position to the uncoupled position.

13. Coupling of claim 10:

wherein the camming surface terminates between the latch axis and the pivot axis at a point spaced away from the pivotal axis; and wherein the guide surface is spaced away from the pivotal axis towards the camming surface in the coupled position of the arm.

14. Coupling of claim 1, comprising:

a second side opening;

a second arm; and a second latch means.

15. Fluid conducting coupling, comprising:

a coupler having a first end, a second end for receiving a free end of a connector having a catch disposed on the free end, a flow passageway extending through the first and second ends of the coupler, and a side opening extending transversely through the second end of the coupler;

an arm having a first end pivotably connected to the coupler at the opening and a second end extending therefrom, the arm having a protuberance disposed for engaging the catch at the first end of the arm, the arm being pivotable between a coupled position in which the second end of the arm is closer to the coupler and in which the protuberance extends through the side opening in order to engage the catch and obstruct movement of the connector toward and away from the second end of the coupler, and an uncoupled position in which the second end of the arm is further from the coupler and the protuberance does not obstruct movement of the connector; and latch means, connected to the arm and pivotable between a latching position and an unlatching position about a single latch axis, for releasably engaging a guide surface located on the exterior of the coupler and thereby releasably latching the arm in the coupled position, the latch axis being about parallel to and spaced away from the pivotal axis of the arm, the latch means pivoting in the opposite direction of the arm as the arm is moved from the coupled position in order to release the arm from the coupled position, the latch means comprising:

a latch body have a latching end extending toward the first end of the arm and a lever end extending toward the second end of the arm, the latching end terminating in an apex extending toward the first end of the arm which releasably engages the exterior of the coupler in the coupled position of the arm, the engagement of the apex with the exterior of the coupler holding the arm in the coupled position.

16. Fluid conducting coupling, comprising:

a coupler having a first end, a second end for receiving a free end of a connector having a catch disposed on the free end, a flow passageway extending through the first and second ends of the coupler, and a side opening extending transversely through the second end of the couplers;

an arm having a first end pivotably connected to the coupler at the opening and a second end extending therefrom, the arm having a protuberance disposed at the first end of the arm for engaging the catch, the arm being pivotably between a coupled position in which the second end of the arm is closer to the coupler and in which the protuberance extends through the side opening in order to engage the catch and obstruct movement of the connector toward and away from the second end of the coupler, and an uncoupled position in which the second end of the arm is further from the coupler and the protuberance does not obstruct movement of the connector; and latch means, connected to the arm and pivotable about a single latch axis between a latching position and an unlatching position for releasably engaging the exterior of the coupler and thereby releasably latching the arm in the coupled position, the latch axis being about transverse to the longitudinal axis of the arm; the latch means comprising:

a latch body having a latching end extending toward the first end of the arm and a lever end, the latching end terminating in an apex extending toward the first end of the arm which releasably engages the exterior of the coupler while in the coupled position of the arm, the engagement of the apex with the exterior of the coupler holding the arm in the coupled position; the lever end extending towards the second end of the arm from the latch axis for leveragingly moving the latch means from the latching position to the unlatching position, the lever end terminating between the latch axis and the second end of the arm so that a human user may, with one hand, move the lever end and latch means from the latching position to the unlatching position by directly contacting the lever end with a thumb or a finger and pivoting the lever end toward the coupler while moving the arm away from the coupler and from the coupled position to the uncoupled position.

* * * * *